United States Patent [19]

Engel

[11] Patent Number: 4,626,831

[45] Date of Patent: Dec. 2, 1986

[54] ANALOG SIGNAL PROCESSING CIRCUIT

[75] Inventor: Joseph C. Engel, Monroeville, Pa.

[73] Assignee: Westinghouse Electric Corp., Pittsburgh, Pa.

[21] Appl. No.: 725,179

[22] Filed: Apr. 19, 1985

[51] Int. Cl.[4] .......................... G08B 23/00; H03L 5/00
[52] U.S. Cl. .................................... 340/500; 340/511; 340/661; 340/657; 340/870.21; 307/264
[58] Field of Search ........ 340/500, 511, 657, 660–664, 340/506, 870.21, 870.12, 870.13; 307/261, 264, 268; 370/18, 53; 364/138, 139

[56] References Cited

U.S. PATENT DOCUMENTS

| 4,191,995 | 3/1980 | Farrow | 307/264 |
| 4,192,003 | 3/1980 | Brock et al. | 307/264 |
| 4,504,747 | 3/1985 | Smith et al. | 307/264 |

*Primary Examiner*—Donnie L. Crosland
*Attorney, Agent, or Firm*—W. E. Zitelli

[57] ABSTRACT

An analog signal processing circuit including both an analog signal multiplexer and a ranging circuit in cascade therewith is adapted for use in an integrated circuit. The multiplexer has a plurality of input current paths and an output current path. It responds to a set of coded selection signals to couple one of the input current paths to the output current path to permit current therebetween and includes another circuit for maintaining the selected input current path at a predetermined potential, preferably ground potential. The ranging circuit has its input current path coupled to the output current path of the multiplexer and includes a plurality of current splitters coupled in a cascaded chain having one end of the chain coupled to its input current path. The ranging circuit responds to another set of coded selection signals to draw current from one and another current paths to the output current path of the multiplexer. Current representative of the current only through the other current paths of the current splitters is provided to the output current path of the ranging circuit. Accordingly, the current of the multiplexer is ranged at the output current path of the ranging circuit in accordance with the code of the selection signals of the ranging circuit.

14 Claims, 11 Drawing Figures

ANALOG SIGNAL PROCESSING CIRCUIT

BACKGROUND OF THE INVENTION

The present invention relates to integrated circuits in general, and more particularly, to an analog signal processing circuit including an analog signal multiplexing circuit and a ranging circuit in cascade therewith adapted for use in an integrated circuit.

Electronic measurement and control products having application in industrial and utility environments are presently utilizing programmed microprocessor systems which offer increased product performance. However, these systems are not without their drawbacks. For example, most microprocessor systems require analog signal processing circuitry including an analog-to-digital converter and analog signal multiplexing and ranging circuitry for use therewith. In addition, the microprocessor requires supervision circuitry for performing the commonly known functions of "power-on/down" reset and "deadman" reset for use in conjunction with the execution of the microprocessor's programmed instructions. And, all such electronic products require power supply regulation and generation circuitry. Accordingly, the cost and complexity of the aforementioned ancillary circuits tend to negate the increased performance offered by the programmed microprocessor systems.

It has become a challenge to circuit designers to find innovative methods to significantly reduce the cost and complexity of these ancillary circuits in order to render a more viable microprocessor system. One such method is being proposed herein for combining these necessary ancillary circuits into a single custom linear integrated circuit for a wide span of microprocessor system applications. Having the ancillary circuits embodied in a single integrated circuit has the affect of increasing reliability and, as the frequency of use and manufacturing volume developes, of eventually reducing costs.

SUMMARY OF THE INVENTION

In accordance with the present invention, an analog signal processing circuit including an analog signal multiplexing circuit and a ranging circuit in cascade therewith is adapted for use in an integrated circuit. The multiplexing circuit includes a plurality of input current paths, an output current path, a channel select circuit, and first circuit means. The channel select circuit responds to a set of coded selection signals to couple a selected input current path to the output current path to permit current therebetween. The first circuit means maintains the selected input current path at a first predetermined potential.

The ranging circuit has an input current path coupled to the output current path of the multiplexing circuit and includes a plurality of current splitters coupled in a cascaded chain having one end coupled to the input current path. Each of the current splitters is coupled to one and another current paths. The range select circuit is responsive to another set of coded selection signals to split the current of the input current path between the one and another current paths of the current splitters in a proportion as governed by the code of the range selection signals. Further included is means for providing current at the output current path representative of the current through the other current paths of the current splitter. Accordingly, the current of the input current path is ranged at the output current path in accordance with the code of the range selection signals.

DESCRIPTION OF THE PREFERRED EMBODIMENTS

Figure 1:
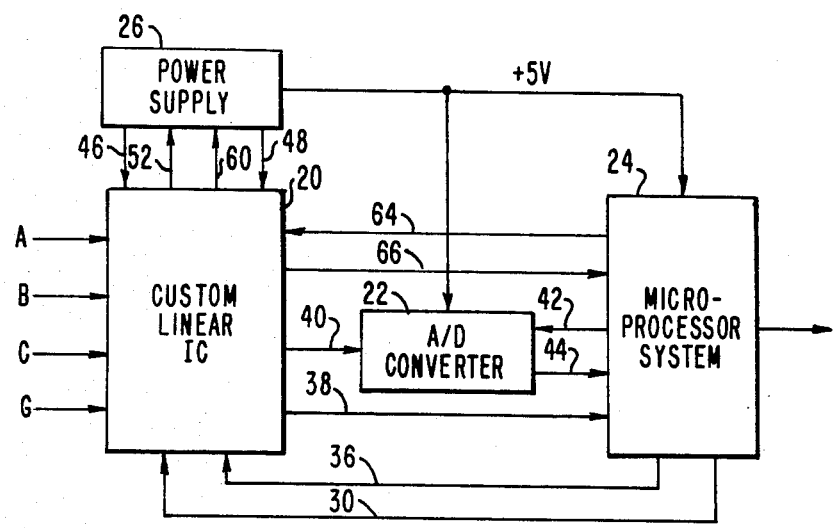
FIG. 1 is a block diagram schematic illustrating a circuit environment in which a custom linear integrated circuit may be embodied.

A custom linear integrated circuit 20 including the functions of analog signal processing, program execution supervision, and power supply monitoring and regulation, may be architecturally coupled to an analog-to-digital (A/D) converter 22, which may be of a conventional integrated circuit variety, a microprocessor system 24 which may be similar to the type manufactured by Intel Corporation having a Model No. 8051, and a power supply 26 much in the fashion as depicted in the functional block diagram schematic of FIG. 1. A functional block diagram schematic depicting a suitable embodiment of the custom linear integrated circuit 20 is shown in FIG. 2.

Figure 2:
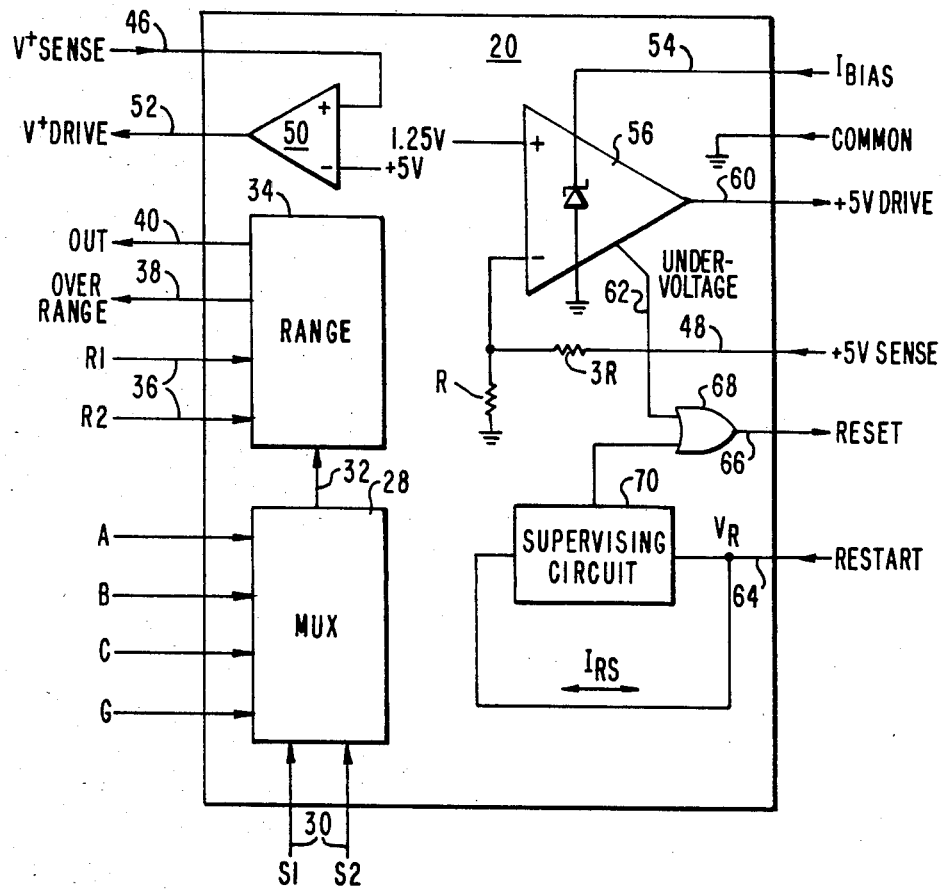
FIG. 2 is a functional block diagram schematic of a custom linear integrated circuit embodiment suitable for use in the environment of FIG. 1.

More specifically, referring to FIGS. 1 and 2, a plurality of analog signals, denoted as A, B, C and G, are coupled to an analog signal multiplexing circuit 28 of the integrated circuit 20. One of the analog signals may be selected by the microprocessor system 24 utilizing the signal lines 30 which may include selection signals S1 and S2. In accordance with the code of the selection signals S1 and S2, one of the analog signals A, B, C and G is conducted over signal line 32 to a ranging circuit 34 in the integrated circuit 20. The purpose of the ranging circuit 34 is to provide a ranged signal to maximize the resolution of its digital conversion by the converter 22 without going beyond the limited dynamic range of the converter 22. In the present embodiment, the microprocessor system 24 selects the desired range utilizing the selection signals R1 and R2 provided over signal lines 36 while monitoring an overrange signal over signal line 38.

Once the ranging has been achieved, the ranged analog signal is provided to the A/D converter 22 from the ranging circuit 34 over signal line 40. The microprocessor system 24 may control the A/D conversion of the selected/ranged analog signal using control lines 42 which may also access the digitized analog signal over signal lines 44 to the microprocessor system 24.

In addition, the integrated circuit 20 includes circuitry for regulating various voltages of the power supply 26. In the present embodiment, the power supply 26 produces both a V+ voltage potential and a +5 volt potential. The V+ and 5 volt potentials are sensed by the regulating circuits of the integrated circuits 20 using signal lines 46 and 48, respectively. The V+ regulator depicted functionally at 50 in the integrated circuit 20 compares the V+ sense voltage over signal line 46 with a reference voltage like the five volt supply, for example, and regulates the power supply 26 using drive signal line 52 to maintain a fixed difference therebetween.

Moreover, a current bias 54 denoted as $I_{BIAS}$ may be supplied to the 5 volt regulator depicted at 56 in the integrated circuit 20. In the present embodiment, the regulator 56 functions as a zener diode to maintain an adequate voltage potential across the regulator 56. The regulator 56 operates as a high gain operational amplifier having a reference voltage of 1.25 volts, for example, coupled to the non-inverting (+) input thereof and the sense line 48 of the 5 volt potential conducted to the inverting (−) input thereof through a proper resistance dividing network which may have a ratio of one-to-four. The output signal of the regulator 56 regulates the 5 volt power supply using drive signal line 60. The 5 volt bus also supplies power to the A/D converter 22 and microprocessor system 24 in the present embodiment. The regulator 56 is further operative to detect an undervoltage condition of the 5 volt supply which includes both power up and power down situations and to generate a signal 62 indicative thereof.

Still further, the integrated circuit 20 includes a circuit represented by the block 70 for supervising the program execution of the processing unit 24 by monitoring a restart signal over signal line 64 generated by the processing unit 24 during the program execution thereof. Under certain conditions indicative of either improper program execution or power supply undervoltage, a reset signal is generated by the supervising circuit and supplied to the microprocessor system 24 over signal line 66 to govern the program execution thereof to a prespecified point from which point program execution may continue upon removal of the reset signal 66. The supervising circuit 70 operates primarily with regard to the voltage $V_R$ measured at its input and the amount and direction of current $I_{RS}$ provided thereby. The circuit 70 will be described in greater detail in accordance with the description of FIGS. 7 through 10 found hereinbelow.

The analog signal multiplexing circuit 28 will now be described in greater detail in connection with the functional block diagram schematic of FIG. 3 and the circuit schematic of FIG. 4. In the present embodiment, the analog signals A, B, C and G are represented by respective currents $I_A$, $I_B$, $I_C$ and $I_G$. The analog signal multiplexing circuit 28 provides a plurality of input current paths 80, 81, 82 and 83 to accommodate respectively the analog input current signals $I_A$, $I_B$, $I_C$ and $I_G$. A switching circuit is provided for each input current path 80 through 83 and represented respectively by transistors Q1 through Q4. The transistors Q1 through Q4 have their emitters respectively coupled to the input current paths 80-83, their collectors coupled together to a common output path 84, and their bases coupled together to a common control line 86.

Further provided in circuit 28 is a channel select circuit comprising a set of transistors represented by Q5, Q6, Q7 and Q8 and a channel decoder circuit 88. The transistors Q5 through Q8 having their emitters respectively coupled to the analog input current paths 80 through 83, their collectors commonly coupled to a voltage potential, like 5 volts, for example, and wherein their bases are driven individually by the channel decoder circuit 88 in accordance with the code of the selection signals S1 and S2 provided to the channel decoder circuit 88. In the present embodiment, the transistor of the group Q5 through Q8 associated with the selected current input path is blocked and the transistors of the group Q5 through Q8 associated with the unselected current input paths are energized.

Figure 4:
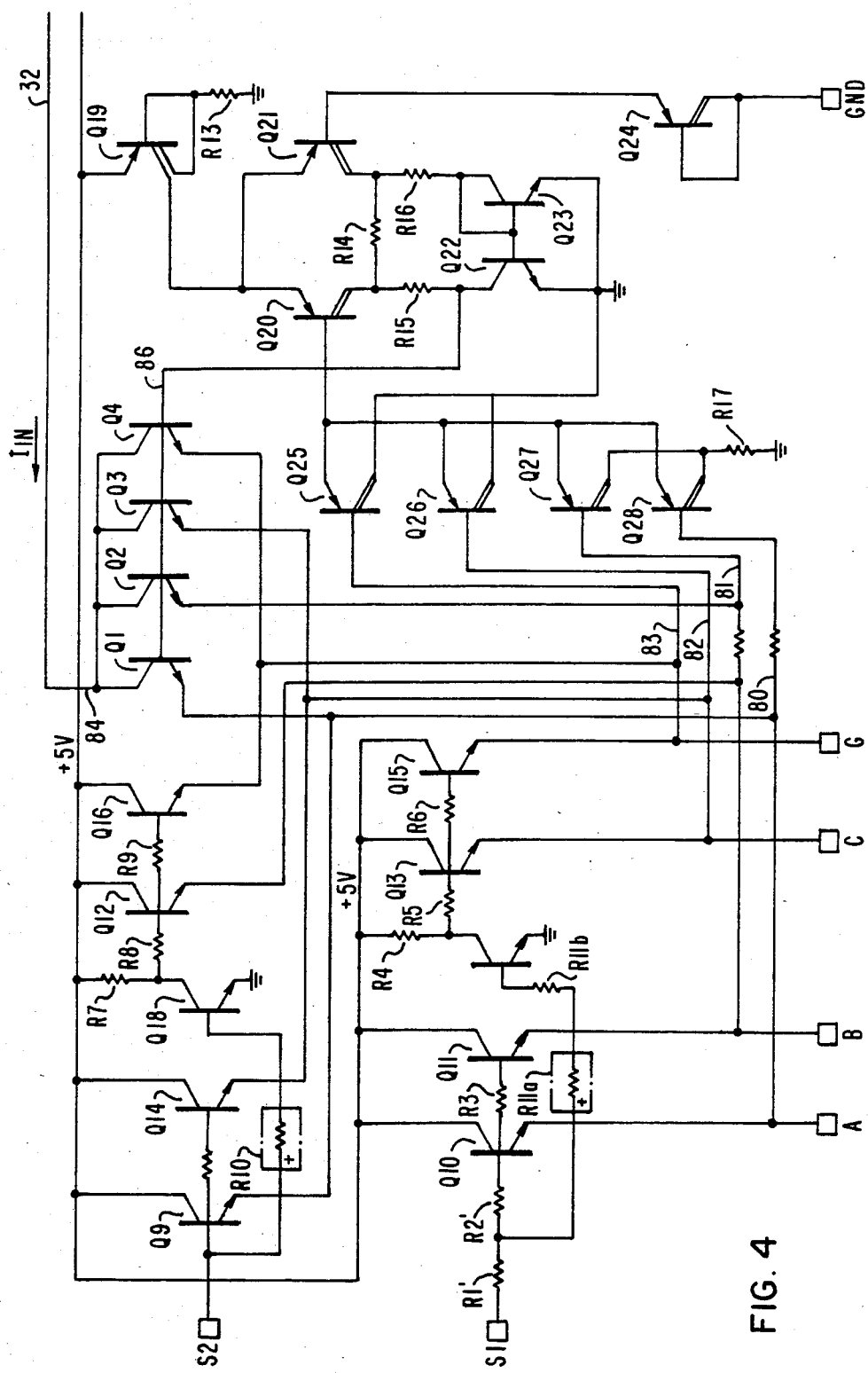
FIG. 4 is a circuit schematic of an analog signal multiplexing circuit suitable for use in the integrated circuit of FIG. 2.

A suitable circuit embodiment for the channel select portion of the analog signal multiplexing circuit 28 is shown in FIG. 4. More specifically, transistors Q9 and Q10 are coupled in parallel across the 5 volt bus and the input current path 80. The transistor Q9 is driven by the selection signal S2 and the transistor Q10 is driven by the selection signal S1 through a series connection of resistors R1 and R2. R1 may be on the order of 3.6K ohms and R2 may be on the order of 450 ohms, for example. In a similar arrangement, transistors Q11 and Q12 are coupled between the 5 volt bus and the input current path 81, transistors Q13 and Q14 are coupled between the 5 volt bus and the input current path 82, and transistors Q15 and Q16 are coupled between the 5 volt bus and the input current path 83.

Transistor Q11 is driven by the selection signal S1 through a series of connected resistors R1, R2 and R3 which may be on the order of 5K ohms, for example. Transistors Q13 and Q15 are diven by the selection signal S1 through an inverter circuit comprising transistor Q17 and resistor R4 which may be approximately 12K ohms, for example. Transistor Q13 is driven from the collector of transistor Q17 through resistor R5 which may be on the order of 5.4K ohms and transistor Q15 may be driven also from the collector of transistor Q17 through a series of connected resistors R5 and R6 which may be on the order of 225 ohms, for example. Similarly, transister Q11 may be driven by signal S2 through resistor R6a which may be on the order of 6.75K ohms, and transistors Q12 and Q16 may also be driven by the selection signal S2 through an inverter circuit comprising transistor Q18 and resistor R7 which may be on the order of 11.7K ohms, for example. Transistor Q12 may be driven from the collector of transistor Q18 through resistor R8 which may be on the order of 3.6K ohms and transistor Q16 may also be driven from the collector of Q18 through a series of connected resistors R8 and R9 which may be on the order of 3.6K ohms, for example. Transistor Q18 may be driven by the selection signal S2 through resistor R10 which may be variable having a full range of 30K ohms and transistor Q17 may be driven by the selection signal S1 through resistors R1, R11a and R11b. Resister 11a may be variable having a full range of 30K ohms and resistor 11b may be on the order of 900 ohms.

The decoder circuit 88 operates to select a current input path in accordance with the truth table of Table 1 found here below. For example, if the selection signals are both "0", that is the potentials thereof are substantially close to ground potential, transistors Q9, Q10, Q11 and Q14 will be blocked and transistors Q13 and Q15 will be energized via inverter circuit Q17 and transistors Q12 and Q16 will be energized via inverter circuit Q18. The energization of transistors Q12, Q13 and Q15 or Q16 causes the input current paths 81, 82 and 83 to be brought to a positive potential, say on the order of 4 volts, for example. The current input path 80 remains unaffected by the selection code because the transistors Q9 and Q10 coupled thereto are both in the blocked state. The foregoing described selection circuit operates to allow the selected current input path to be controlled by the remaining circuitry of the multiplexing circuit while holding the unselected current input paths to the approximately 4 volt level in accordance with the truth table of Table 1.

TABLE 1

| S1 | S2 | Current Path Selected |
|----|----|----------------------|
| 0  | 0  | 80 |
| 0  | 1  | 81 |
| 1  | 0  | 82 |
| 1  | 1  | 83 |

Figure 3:
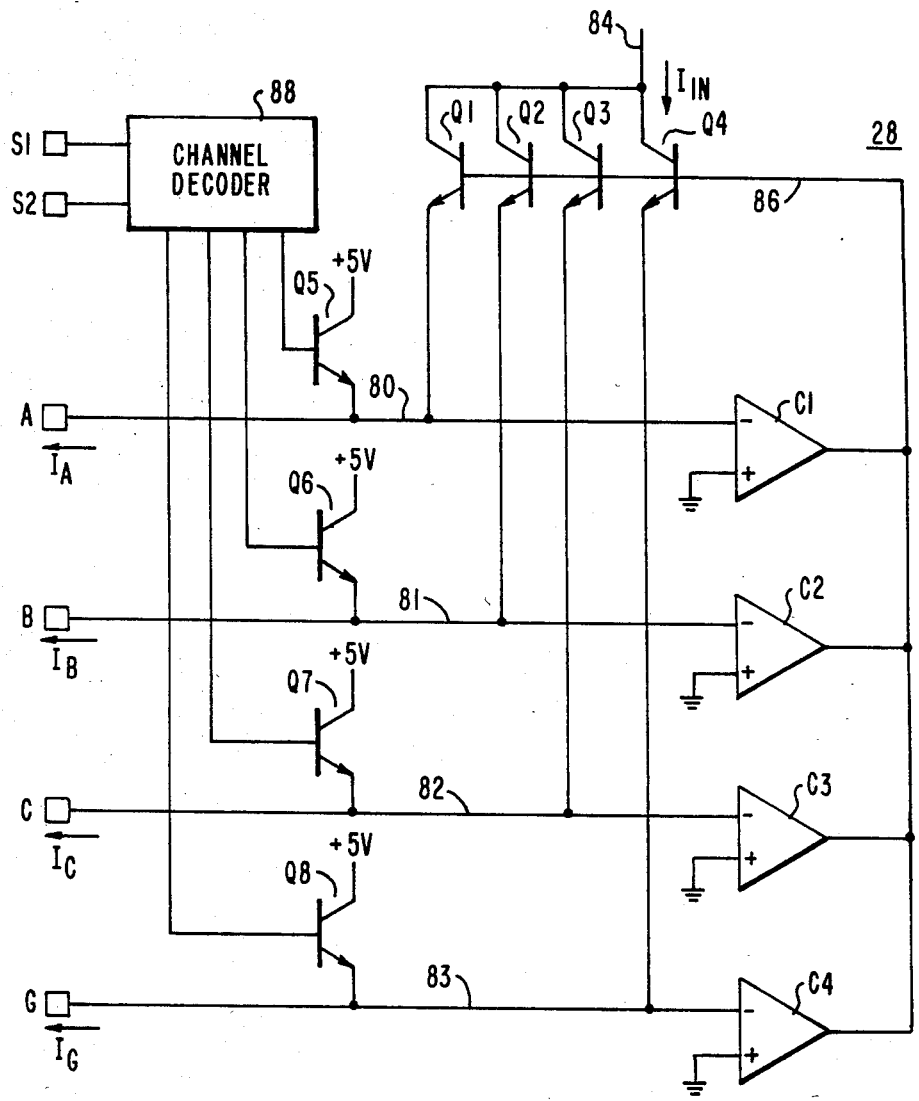
FIG. 3 is a functional block diagram schematic of an analog signal multiplexing circuit adaptable for use in the custom linear integrated circuit of FIG. 2.

As shown in FIG. 3, the multiplexing circuit 28 further includes the comparator circuits C1 through C4 respectively coupled to each of the analog current input paths 80 through 83. The potentials of the current input paths 80-83 are individually compared to a reference potential like virtual ground, for example, by the circuits C1 through C4, respectively. The outputs of the circuits C1 through C4 may be commonly coupled to drive the transistors Q1 through Q4 via control line 86. The foregoing described structure permits the selected input path to be maintained at the reference potential which may be virtual ground. FIG. 4 offers a suitable more specific circuit embodiment of the foregoing described structure.

Referring to FIG. 4, a current source comprising transistor Q19 having its emitter coupled to the 5 V bus and a resistor R13 coupled from the base of Q19 to ground provides current from the collector of Q19 to a current mirror circuit comprising transistors Q20 and Q21. The current through Q19 is provided to the commonly coupled emitters of transistor Q20 and Q21 which have their collectors coupled through resistor R14 which may be on the order of 10.4K ohms in value. The collectors of transistors Q20 and Q21 may also be separately coupled through corresponding resistors R15 and R16 to the collectors of transistors Q22 and Q23, respectively. R15 and R16 may be of the same value, say 1.35K ohms, for example. The emitters of transistors Q22 and Q23 may be coupled to ground potential and the bases thereof may be commonly coupled together and coupled to the collector of the transistor Q23. The base of the transistor Q21 may be coupled through transistor Q24 configured as a forward bias diode to ground potential. The base of transistor Q20 is commonly coupled to the emitter of a plurality of transistors Q25, Q26, Q27 and Q28. The collectors of transistors Q25 and Q26 are commonly coupled to ground potential and the collectors of transistors Q27 and Q28 are commonly coupled through a resistor R17 which may be on the order of 3.6K ohms, for example, to ground potential. The bases of the transistors Q25 through Q28 are respectively coupled to the current input paths 83, 82, 81 and 80. The collector of transistor Q22 may be coupled through the control line 86 commonly to the bases of the transistors Q1 through Q4.

In operation, the current source from Q19 passes through the base emitter path of Q21 and the diode configuration of Q24 to ground. This conduction path provides a voltage potential at the collectors of transistors Q20 and Q21 of approximately 1.2 volts. As described hereabove, the unselected input current paths are brought to a positive potential on the order of 4 volts, for example, by the selection circuit. This positive potential reverse biases the transistors of the group of Q25 through Q28 and the transistors in the group of Q1 through Q4. Thus, with any given selection code of the selection signals S1 and S2 only one of the current input paths 80 through 83 may conduct current from its respective transistor of the group Q25 through Q28. Accordingly, current is permitted to flow from transistor Q20 through the base emitter path thereof to the base emitter path of the selected transistor of the group Q25 through Q28. The voltage at the collector of Q22 which is approximately 0.6 volts drives the forward biased transistor of the group of Q1 through Q4 thus causing the selected input current path to be at approximate virtual ground.

Should the voltage potential of the selected input current path increase slightly, the voltage across the base emitters of the corresponding transistor of the group Q25 through Q28 and the transistor Q20 will decrease which causes a change in the collector voltage of Q22 to maintain the voltage potential of the selected input current path at the substantially virtual ground. Similarly, with a decrease in voltage potential of the selected input current path, the collector voltage of transistor Q22 will be caused to move in the reverse direction by the same circuit mechanisms to again return the selected input current path to substantially virtual ground. In the foregoing manner, the selected input current path will always be maintained at substantially virtual ground chosen therefore in the present embodiment.

The same mechanism which maintains the input circuit path at the chosen potential forward biases the corresponding transistor of the group Q1 through Q4 to pass current from the output current path 84 to the selected input current path of the group 80 through 83. The amount of current flowing is representative of the selected signal $I_A$ through $I_G$ associated with the selected input path. The selected analog input current is conducted over the output path 84 and over the signal path 32 to the ranging circuit 34 as shown in the block diagram of FIG. 2.

Figure 5:
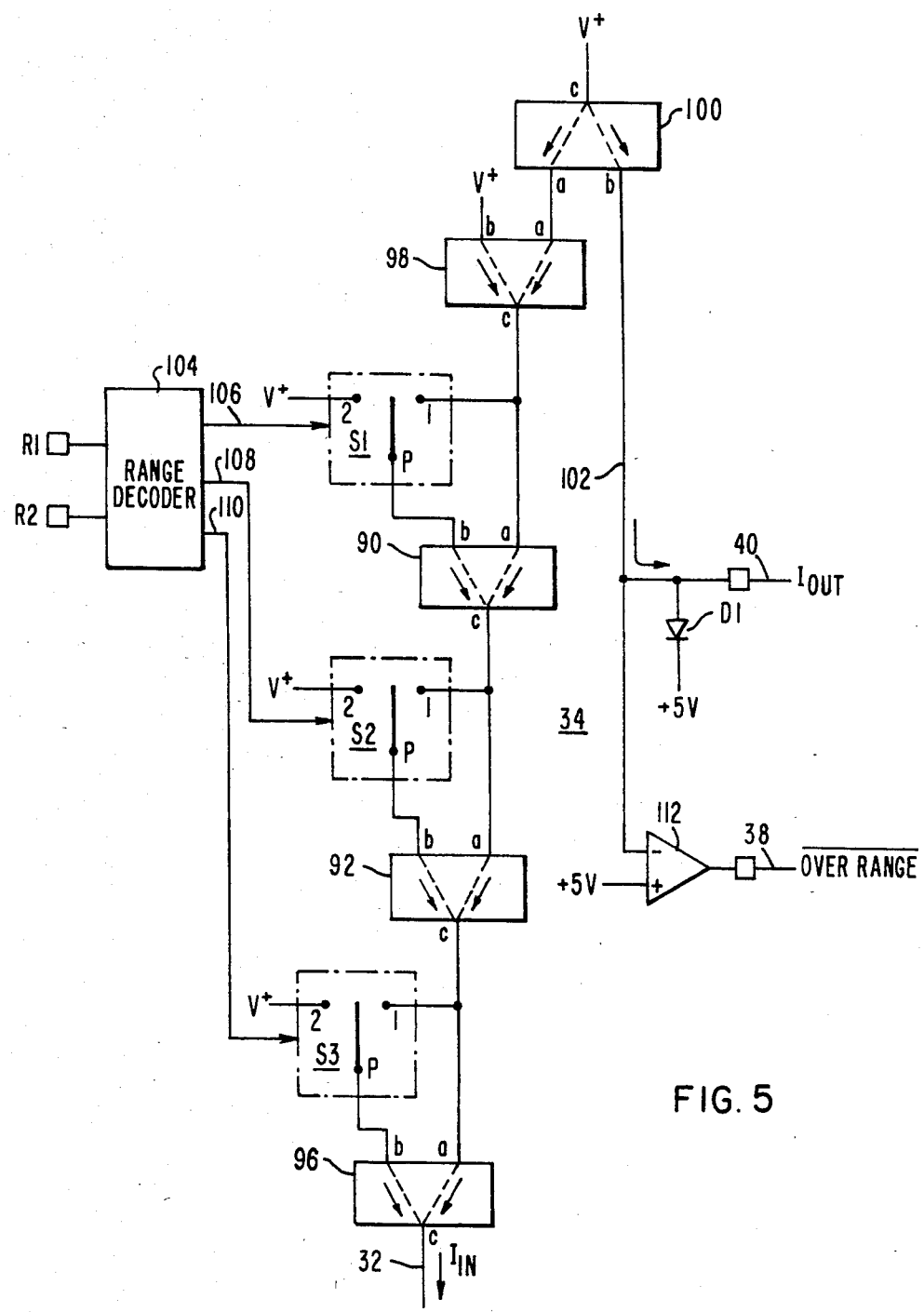
FIG. 5 is a functional block diagram schematic of a ranging circuit adapted for use in the integrated circuit embodiment of FIG. 2.

The ranging circuit 34 will now be described in greater detail in connection with the functional block diagram schematic of FIG. 5 and the more specific circuit diagram of FIG. 6. Referring to FIG. 5, the ranging circuit 34 includes a plurality of cascadedly coupled current splitters like that shown at 90, 92 and 96, for example. Each current splitter 90, 92 and 96 includes first and second inputs denoted by a and b, respectively, and a common output denoted by c, to effect two separate current paths ac and bc from which current may be drawn, the fractional portions of which shown in FIG. 5 above each path being predeterminedly fixed. For example, in current splitter 90, one-fourth of the current drawn from the common output c passes through the ac path and three-fourths passes through the bc path. Similarly, the current ratios of splitters 92 and 96 are both ½—½.

The current splitters of the plurality are cascaded by coupling the common outputs c of one current splitter to the first input a of the next current splitter in the cascaded path. Current splitter 96 at one end of the cascaded path has its common output c coupled to the signal path 32 from which the selected analog input current is drawn from the multiplexing circuit 28. At the other end of the cascaded path, the first input a of the current splitter 90 may be coupled to the common output c of another current splitter 98 which functions as a current limiter. The second input b thereof may be coupled to a source V+. The first input a of the current limiter 98 may be coupled to another current splitter 100 which functions as a current mirror. The current mirror circuit 100 may have its common port c coupled to the source V+, its first input a coupled to the first input a of the current limiter 98 and its second input b coupled to the output path 102 of the ranging circuit 34. The current mirror 100 provides substantially equal amounts of current to flow through the ca and cb current paths thereof. Thus, whatever current is drawn through the ca path will similarly be drawn through the cb path and provided to the output current path 102. A suitable current limit for the current limiter 98 may be on the order of 300 microamps, for example.

The ranging circuit 34 further includes a range select circuit comprising a range decoder 104 and a plurality of switches S1, S2 and S3 corresponding to the current splitters 90, 92 and 96, respectively. Each switch S1, S2 and S3 has its pole position p coupled to the second input b of its corresponding current splitter 90, 92 and 96. Switch position 1 of each of the switches S1, S2 and S3 is coupled to the first input a of its corresponding current splitter 90, 92 and 96. The second position 2 of each of the switches S1, S2 and S3 is coupled to the source V+. The range decoder 104 is operative to decode the code of the selection signals R1 and R2 and govern the positions of the switches S1, S2 and S3 via the control lines 106, 108 and 110, respectively.

The output current path 102 of the ranging circuit 34 may be clamped to a reference potential, say 5 volts, for example, through a diode D1. In addition, the voltage of the output path 102 may be compared with a reference potential, like 5 volts, for example, in a comparator circuit 112 which is operative to effect an overrange signal which may be conducted over the signal path 38 to the processing unit 24. The current output signal conducted over the output path 102 may be conducted to the A/D converter 22 over the signal line 40.

In operation, a selected analog input signal current is drawn from the path 32. The current of path 32 is ranged by the cascadedly coupled current splitters 90, 92 and 96 in accordance with the code of the selection signals R1 and R2. The current mirror 100 provides current to the output path 102 substantially equal to the ranged current of the current splitters 90, 92 and 96. A suitable current ranging versus code truth table is found in Table 2 found hereinbelow. For example, when the code of the selection signals R1, R2 are both "0's", the range decoder 104 governs the switches S1, S2 and S3 to position one via signal lines 106, 108 and 110, respectively. With the switches S1, S2 and S3 in position 1 all of the current drawn from the path 32 flows from the path ca of the current mirror 100. Thus, the current flowing at the output path 102 is substantially equal to the current drawn from the path 32 whereby the ranging of the current is unity in compliance with the truth table of Table 2.

With a code of 01 from the selection signals R1 and R2, respectively, the range decoder 104 governs switch S3 to the second position and maintains the switches S1 and S2 in the first position. Thus, only one-half of the current drawn from the path 32 flows through the cascaded path of the current splitters yielding a current ranging of $\frac{1}{2}$ at the output path 102. The other one-half of the current drawn from the path 32 is provided from the source V+ through the bc current path of the current splitter 96. Accordingly, with a code 11 from the selection signal lines R1 and R2, respectively, the switches S2 and S3 are governed to position 2 and switch S1 is governed to position 1. Thus, only $\frac{1}{4}$ of the current drawn from the path 32 passes through the path ac of the current splitter 96 and only $\frac{1}{2}$ of that current passes through the path ac of the current splitter 92 whereby the current drawn through the current splitter 90 is only $\frac{1}{4}$ of the current drawn from the path 32 yielding a current ranging of $\frac{1}{4}$ at the output current path of 102. The other $\frac{3}{4}$ of the current drawn from the current splitters 92 and 96 is taken from the source V+ through their current paths bc.

Finally, with a code 10 from the selection signal lines R1 and R2, respectively, all three switches S1, S2 and S3 are governed to position 2 causing only 1/16 of the current drawn from the path 32 to flow from the ca path of the current mirror 100 yielding a current ranging of 1/16 at the output path 102. The other 15/16 of the current drawn from the path 32 is conducted over the paths bc of the current splitters 90, 92 and 96. At any time during the ranging procedure, should the voltage of the output current path 102 become greater than the reference potential, preferably 5 volts, the circuit 112 generates the overrange signal which is conducted to the processing unit over signal line 38.

TABLE 2

| R1 | R2 | G | I1 | I2 | I3 |
|---|---|---|---|---|---|
| 0 | 0 | 1 | 0 | 0 | 0 |
| 0 | 1 | $\frac{1}{2}$ | 1 | 0 | 0 |
| 1 | 1 | $\frac{1}{4}$ | 1 | 1 | 0 |
| 1 | 0 | 1/16 | 1 | 1 | 1 |

Figure 6A:
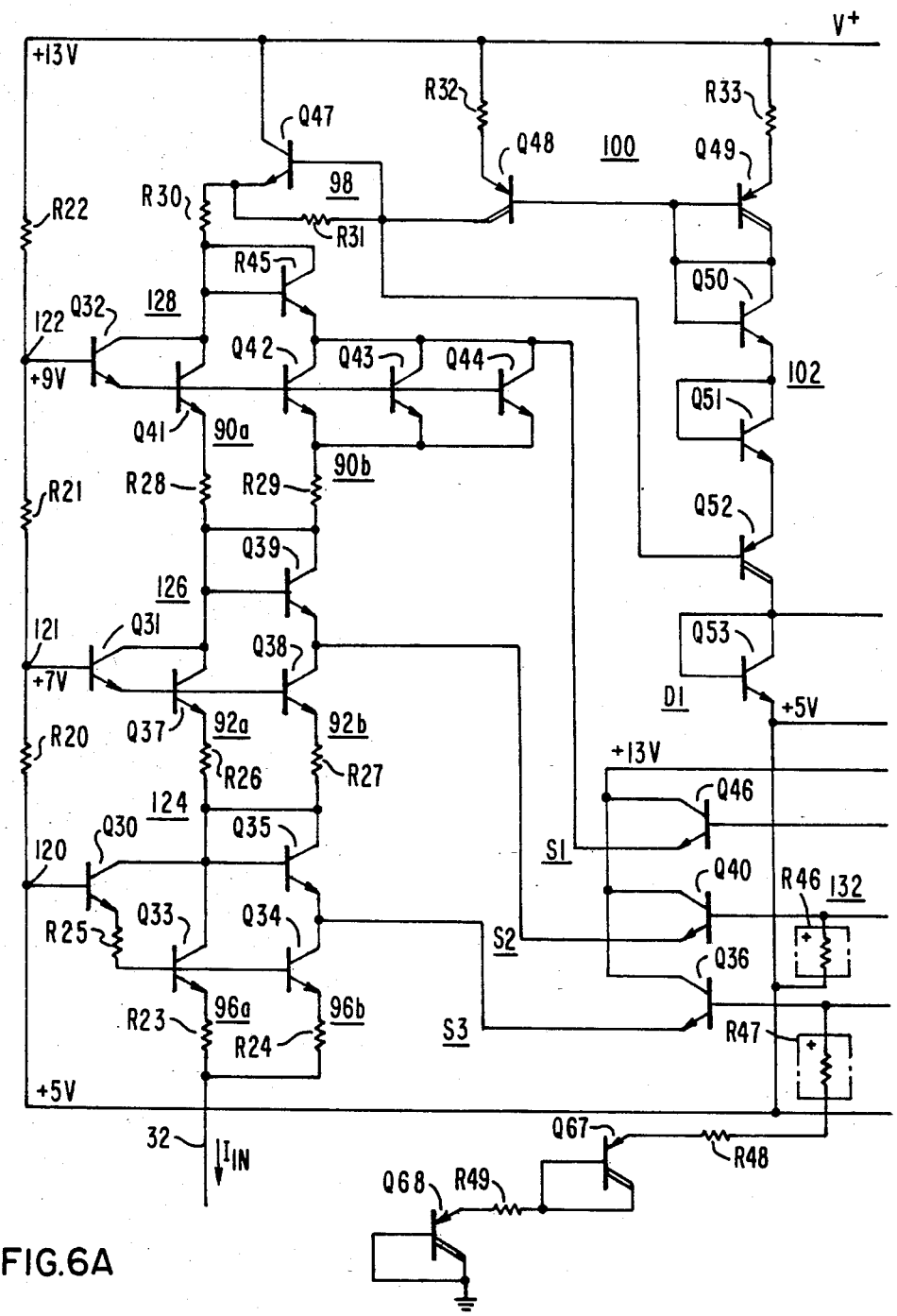
FIGS. 6A and 6B together depict a circuit schematic of a ranging circuit suitable for embodying the functions of the embodiment depicted in FIG. 5.
Figure 6B:
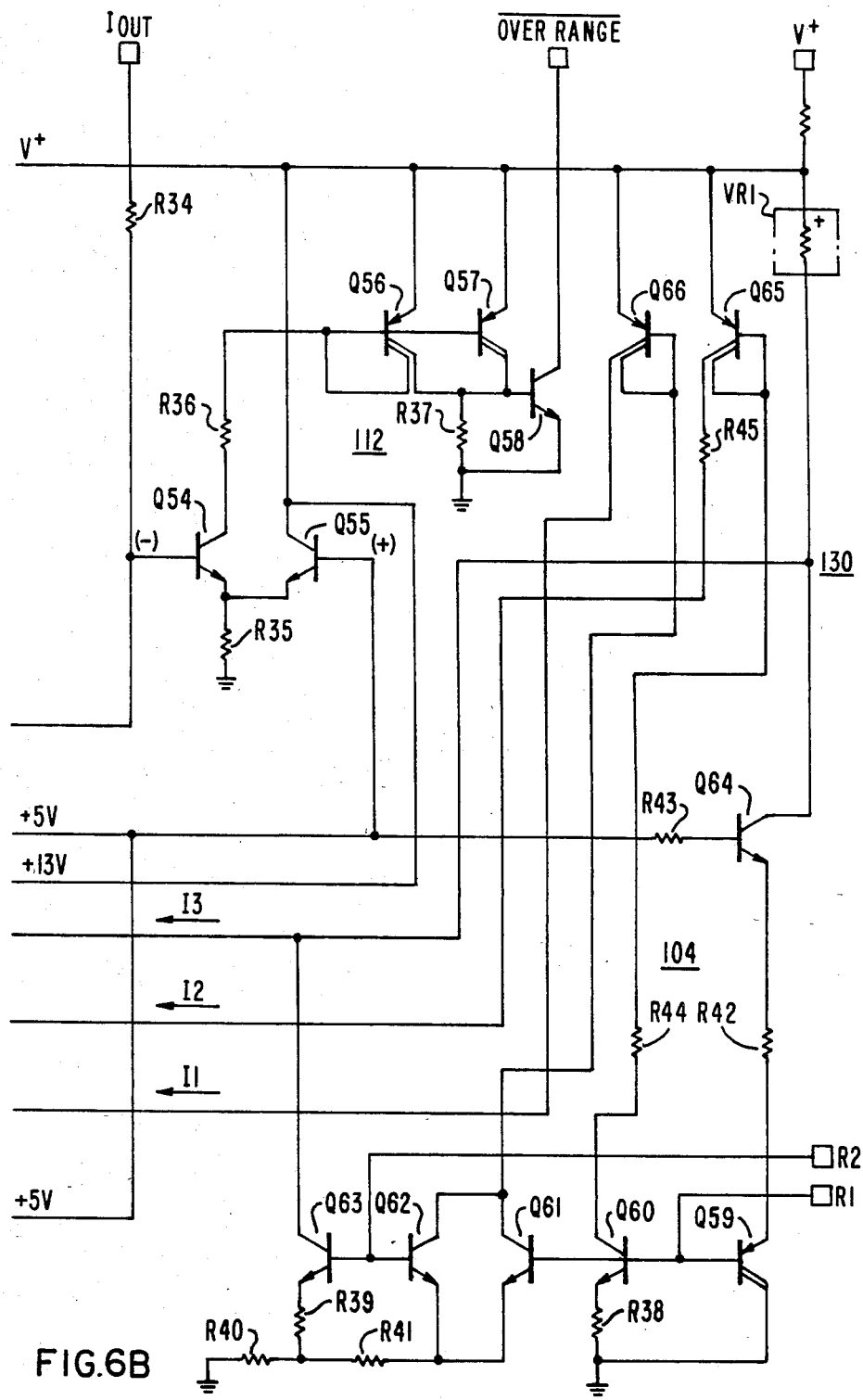

A suitable circuit embodiment for the ranging circuit described in connection with FIG. 5 is shown in FIGS. 6A and 6B. Referring to FIGS. 6A and 6B, a voltage divider network is provided using resistors R20, R21 and R22 connected in series across the voltage potentials V+ and 5 volts. The values of the resistors R20, R21 and R22 may be on the order of 3.6K ohms, 3.15K ohms, and 6.75K ohms, respectively, which in turn effects the voltages 5 volts, 7 volts and 9 volts, at the series connection points 120, 121 and 122, respectively, of the voltage divider network. The voltage points, 120, 121 and 122 are buffered by transistors Q30, Q31 and Q32, resepctively, which offer high impedance to the aforementioned voltage points while being forward biased thereby to provide a biasing current for the current splitter paths in each case.

The current path 96a is comprised of the transistor Q33 in series with the resistor R23 which may have a value on the order of 770 ohms, and similarly, the current path 96b is comprised of transistor Q34 in series with resistor R24 which may have a value on the order of 770 ohms also. The resistor R23 and R24 are coupled together to the input current path 32 from which input current $I_{in}$ may be drawn. The transistor Q30 being forward bias provides biasing current to the transistors Q33 and Q34 through resistor R25 which may have a value on the order of 450 ohms. Switch S3 comprises transistors Q35 and Q36 having their emitters tied together to the collector of the transistor Q34. The collector of Q36 is coupled to the V+ source which may be on the order of 13 volts, for example. The collector and base of Q35 are coupled together to the collectors of Q30 and Q33 at point 124. Transistor Q36 is driven by the current I1 effected by the range decoder circuit 104 which will be described in greater detail here below.

Current splitter path 92a is comprised of transistor Q37 and resistor R26 in series therewith, and similarly current path 92b is comprises of transistor Q38 connected in series with a resistor R27. Resistors R26 and R27 which may be of substantially the same value, 770 ohms, for example, are coupled together at point 124. Transistor Q31 offers biasing current to the transistors Q37 and Q38. Switch S2 comprises transistors Q39 and Q40 having their emitters tied together and coupled to the collector of transistor Q38. Transistor Q40 has its collector coupled to the V+ source and is driven by the current I2 effected by the decoder circuit 104. Transistor Q39 has its collector and base tied together to the collectors of transistors Q31 and Q37 at point 126.

In a similar arrangement, current path 90a is comprised of transistor Q41 in series with the resistor R28 which may be on the order of 1.35K ohms. Current path 90b is comprised of three transistors Q42, Q43 and Q44 coupled in parallel collector to collector and emitter to emitter and all three transistors being connected in series with the resistor R29 which may have a value on the order of 450 ohms. Resistors R28 and R29 are coupled together at point 126. The transistor Q32 provides biasing current to the resistors Q41 through Q44. Switch S1 comprises transistors Q45 and Q46 having their emitters coupled together. Transistor Q46 has its collector coupled to the V+ source and is driven by a current signal I3 which is effected by the decoder circuit 104. Transistor Q45 has its emitter coupled to the collectors of transistors Q42 through Q44 and has its base and collector coupled together to the collectors of transistors Q32 and Q41 at point 128.

The current limiter 98 comprises transistor Q47 and resistors R30 and R31 which may have values of 100 ohms and 1.8K ohms, respectively. The transistor Q47 has its collector coupled to the supply V+ and its emitter coupled to point 128 through the resistor R30. The resistor R31 is coupled across the emitter and base of Q47. Further, the current mirror 100 is comprised of transistors Q48 and Q49 each having their emitters coupled to the supply V+ through resistors R32 and R33 having substantially the same value which may be on the order of 450 ohms, for example. The collector of transistor Q48 is coupled to the base of Q47. The bases of Q48 and Q49 are coupled together and tied to the collector of Q49 which becomes part of the output current path 102. Transistors Q50 and Q51 are configured as forward biased diodes coupled in series in the current path 102. Next in series in the path 102 is a transistor Q52 having its base coupled to the collector of transistor Q48 for biasing purposes. The collector of Q52 provides the output current to signal line 40 through the resistor R34 which may be on the order of 460 ohms, for example. Diode D1 is implemented by transistor Q53 arranged in a diode configuration having the collector thereof coupled to the 5 volt bus.

The input stage of comparator 112 comprises transistors Q54 and Q55 having their emitters tied together and coupled to ground through resistor R35 which may be on the order of 14K ohms. The base of Q54 which may be considered the inverting (−) input of the comparator may be coupled to the collector of transistor Q52 (output path 102) and the base of Q55 which may be considered the non-inverting (+) input of the comparator 112 may be coupled to the 5 volt bus as a reference voltage. The collector of Q55 may be tied to the V+ bus and the collector of Q54 may be tied to the output stage of the comparator 112 through a resistor R36 which may be on the order of 3.6K ohms. The output stage of 112 may be comprised of two transistors Q56 and Q57 coupled in parallel and an open collector transistor Q58. The resistor Q36 is coupled to the commonly coupled bases of Q56 and Q57 which have their emitters commonly tied to the V+ bus. The collectors of transistors Q56 and Q57 are coupled together to the base of Q58 which has its emitter coupled to ground. Another resistor R37 which may have a value of 4.2K ohms may be coupled to ground from the base of Q58. The collector of Q58 governs the overrange signal over the signal line 38.

The range decoder circuit 104 is governed by the selection signals R1 and R2. The selection signal R1 is coupled to the bases of transistors Q59, Q60 and Q61 and signal R2 is coupled to the bases of transistors Q62 and Q63. The collector of Q59 is coupled to ground potential and the emitter of Q60 is coupled to ground potential through a resistor R38 which may be on the order of 7.5K ohms. The collectors and emitters of Q61 and Q62 are coupled together. The emitter of Q63 is coupled to ground potential through a series connection of resistors R39 and R40 which may be on the order of 6.75K ohms and 1.35K ohms, respectively. The series connection point of resistors R39 and R40 may be coupled to the common emitter connection of Q61 and Q62 through resistor R41 which may be on the order of 7.2K ohms. The emitter of transistor Q59 is coupled to the emitter of a transistor Q64 through a resistor R42 which may be on the order of 6.3K ohms. The transistor Q64 is forward biased by the 5 volt bus through a resistor R43 which may be on the order of 900 ohms. The collectors of transistors Q63 and Q64 may be coupled together at a point 130 which is coupled to the V+ source through a variable resistor VR1 which may have a full range of 30K ohms.

The connection point 130 is coupled to the base of the transistor Q46 for providing the current I3 thereto. The collector of transistor Q60 is coupled to the base of a transistor Q65 through resistor R44 which may be 100 ohms. Transistor Q65 has its emitter tied to the V+ bus and its collector tied to the 5 volt bus through a series connection of resistors R45 and R46. Resistor R45 may be of the value 900 ohms and resistor R46 may be adjustable having a full range of 30K ohms. The series connection point 132 of the resistors R45 and R46 is coupled to the base of transistor Q40 for providing the bias current I2 thereto. The collectors of transistors Q61 and Q62 may be commonly coupled to the base of a transistor Q66 which may have its emitter coupled to the V+ bus and its collector coupled to the base of transistor Q36 for providing the bias current I1 thereto. The base of transistor Q36 may be coupled to ground potential through a series connection of resistors R47, R48 and R49 and included in the series path to ground potential may be two transistors Q67 and Q68 configured as forward biased diodes. The resistors R48 and R49 may have values of 3.15K ohms and 1.35K ohms, for example, and the resistor R47 may be adjustable having a full range of 30K ohms.

In operation, the selection signals R1 and R2 exercise the transistors Q59 through Q66 to provide the currents I1, I2, I3 to the switch configurations S3, S2 and S1, respectively, in accordance with the logic of the truth table as shown in Table 2 hereabove. For example, with R1 and R2 having a code of 00, none of the bias currents I1 through I3 is effected by the range decoder circuit 104. Transistors Q36, Q40 and Q46 are in the blocked condition and transistors Q35, Q39 and Q45 are forward biased. In this state, current being drawn from the input path 32 is permitted to flow from the current mirror 100, current limiter 98 and through both paths a and b of each of the current limiters in the cascaded connection path thus effecting a unity current gain.

If on the other hand the current bias signal I1 is effected by the decoder circuit 104, transistor 36 is activated which pulls the collector of transistor Q34 up to substantially the V+ bus which in turn reverse biases transistor Q35. In this state, half of the current being drawn from the input current path 32 is provided from the V+ source through the path 96b and the other half is provided from the current mirror 100 through the path 96a thus effecting a overall current ranging of ½. Similarly, if I1 and I2 bias currents are effected, both transistors Q36 and Q40 are activated bringing both of the collectors of transistors Q34 and Q38 both to the potential of the V+ bus causing the transistors Q35 and Q39 to be reverse biased. In this state, ½ of the current drawn from the current input path 32 is supplied from the V+ source through 96b and ¼ is supplied from the V+ source through 92b and only ¼ of the input current is supplied by the current mirror 100 thus effecting a current ranging of ¼. A similar condition is produced when all three bias currents I1, I2 and I3 are generated including the condition of energizing transistor Q46 and reverse biasing transistor Q45. In this state, with respect to the current drawn from the input path 32, ½ is supplied from the V+ source through the path 96b, ¼ is supplied from the V+ source through the path 92b, and 3/16 is supplied from the V+ source through the path 90b. Only 1/16 of the input current is provided by the current mirror 100 through the paths 90a, 92a and 96a, thereby rendering an overall current ranging of 1/16.

For each current ranging condition, the current mirror 100 provides substantially the same amounts of current flowing through both transistors Q48 and Q49 whereby current representative of the ranged current is provided over the output path 102. Should the path 102 and more specifically the voltage potential at the collector of transistor Q52 become greater than the 5 volt reference potential, the transistor Q54 becomes forward biased and the transistor Q55 becomes reverse biased. In this state, transistors Q56 and Q57 are forward biased providing biasing current to "turn-on" transistor Q58 and effect an overrange signal over signal line 38.

Figure 7:
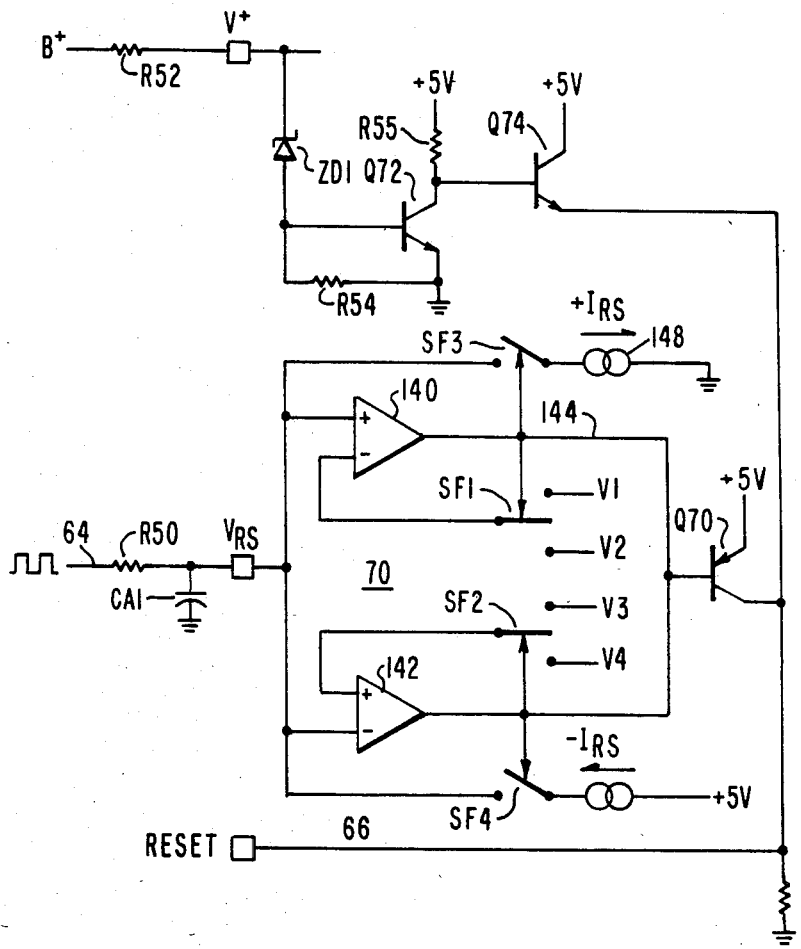
FIG. 7 is a functional schematic illustration of a supervising circuit including an undervoltage detection circuit adapted for use in the integrated circuit embodiment of FIG. 2.
Figure 8:
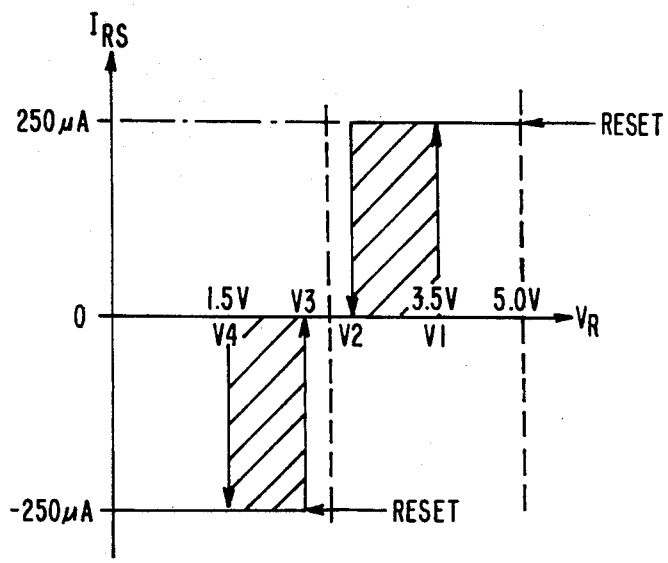
FIG. 8 is a graph characterizing the operation of the supervising circuit shown in FIG. 7.

Next, the supervising circuit 70 along with an overvoltage detection circuit will be described in connection with the functional schematic illustration of FIG. 7. The characteristics of the instant embodiment of the supervising circuit 70 are shown in the graph of FIG. 8. Referring to FIG. 7, the restart signal provided by the processing unit 24 over signal line 64 to the supervising circuit 70 may be of the pulsed variety having a duty cycle or range representing either proper or improper program execution conditions. This will be explained in more detail in the description found hereinbelow. The signal over line 64 may be converted to a pulsed current using a resistor R50 which may have a value of 100K ohms, for example, and be coupled in series with the signal line 64. The restart current may be supplied to a charge storage device, like a capacitor CA1, which may have a value of 1 μF, for example, and may be coupled across the input terminal of the supervising circuit 70 and the ground bus.

The voltage potential $V_R$ across the charge storage device CA1 is representative of the apparent range or duty cycle of the restart signal 64. This potential $V_R$ may be supplied to a non-inverting (+) input of a comparator circuit 140 and an inverting (−) input of another comparator circuit 142. The inverting (−) input of the circuit 140 may be coupled to a switching function SF1 which is operative to couple either a voltage potential V1 or a voltage potential V2 to the (−) input as governed by the state of the output signal 144 of the circuit 140. Similarly, the non-inverting (+) input of the circuit 142 may be coupled to a switching function SF2 which is operative to couple a voltage potential V3 or a voltage potential V4 to the (+) input as governed by the state of the output signal 146 of the circuit 142. Another switching function SF3 is coupled to the input port of the circuit 70 and operative to connect a current source 148 thereto for drawing a current denoted as $+I_{RS}$ from the charge storage device CA1. The switching function SF3 is governed by the state of the output signal 144. Still another switching function SF4 couples another current source 150 to the input port of the circuit 70 for supplying current denoted as $-I_{RS}$ to the charge storage device CA1. The switching function SF4 is governed by the output signal 146. The output signals 144 and 146 are coupled together functionally as an OR gate at the base of a transistor Q70 having its emitter coupled to the 5 volt bus and its collector coupled to the reset line 66 which is coupled to ground potential through a 6.8K ohm resistor, for example.

The foregoing described circuit functions in accordance with the characteristics depicted in the graph of FIG. 8. Referring to FIG. 8, the abscissa is a measure of the voltage across the charge storage device CA1 denoted as $V_R$ and the ordinate is a measure of the current supplied to or drawn from the charge storage device CA1 by the circuit 70. For example, the voltages V1 and V4 may be set at 3.5 volts and 1.5 volts, respectively, and the voltages V2 and V3 may be set somewhat higher and somewhat lower, respectively, of the midrange value between 1.5 volts and 3.5 volts. The current sources 148 and 150 may be set at substantially the same current on the order of 250 microamps.

Characteristically, when the voltage $V_R$ is below the reference voltage V4 which may result from either no restart signal being generated or a restart signal generated with a duty cycle which is out of range indicative of improper program execution, the circuit 142 determines this condition to be a reset condition and generates the output signal 146 in the proper state to energize the transistor Q70 and produce a reset signal over signal line 66 to the processing unit 24. In this state, the signal 146 also controls the switching function SF4 to provide the current $I_{RS}$ to the charge storage device CA1 and also controls the switching function SF2 to provide the reference voltage V3 to the reference input of the circuit 142. Accordingly, current will continue to be supplied to the charge storage device CA1 and the reset signal will continue to be supplied to the processing unit 24 until the voltage $V_R$ is brought above the voltage reference V3 whereat the switching functions SF2 and SF4 are returned to their original positions and the reset signal is relieved.

Similarly, when the voltage $V_R$ is above the reference potential V1 which may result from an out of range duty cycle of the restart signal indicative of improper program execution, the circuit 140 governs its output signal 144 to a state to energize transistor Q70 to provide a reset signal to the processing unit 24. In this state the output signal 144 controls switching function SF3 to draw current $I_{RS}$ from the device CA1 and also governs switching function SF1 to couple the voltage potential V2 to the reference input of the circuit 140. The circuit 70 will remain in the reset state until the voltage $V_R$ falls below the voltage potential V2 whereat the switching functions SF1 and SF3 are returned to their original positions and the reset signal is relieved.

With regard to the undervoltage detection function, current may be supplied via an appropriately chosen resistor R52 to the integrated circuit 20 from an outside source denoted as B+. For detecting an undervoltage condition on the resulting V+ bus, a zener diode function ZD1 is coupled in series with a resistor R54 which may be on the order of 6.5K ohms. The series combination ZD1 and R54 is coupled between the V+ bus and ground. The base of a transistor Q72 is coupled to the series connection between ZD1 and R54. The collector Q72 is coupled to the 5-volt bus through a resistor R55 which may be on the order of 30K ohms and the emitter of Q72 may be coupled to ground potential. The collector of Q72 may also be coupled to the base of another transistor Q74 which has its collector tied to the 5-volt supply and its emitter "OR" coupled to the collector of Q70 which forms the reset signal line 66.

Operationally, when the voltage V+ falls below the current passing differential voltage of the zener diode function ZD1 the transistor Q72 becomes blocked diverting the current through the resistor R55 to forward bias the transistor Q74 which energizes the reset signal line 66. Conversely, when the voltage V+ is sufficient to supply current through ZD1, the transistor Q72 is forward biased bringing its collector to virtual ground and blocking the transistor Q74. In this state, the reset signal due to an undervoltage condition is relieved. Note that if improper program execution exists a reset signal from the supervising circuit 70 will continue until the improper program execution condition is alleviated.

Figure 9:
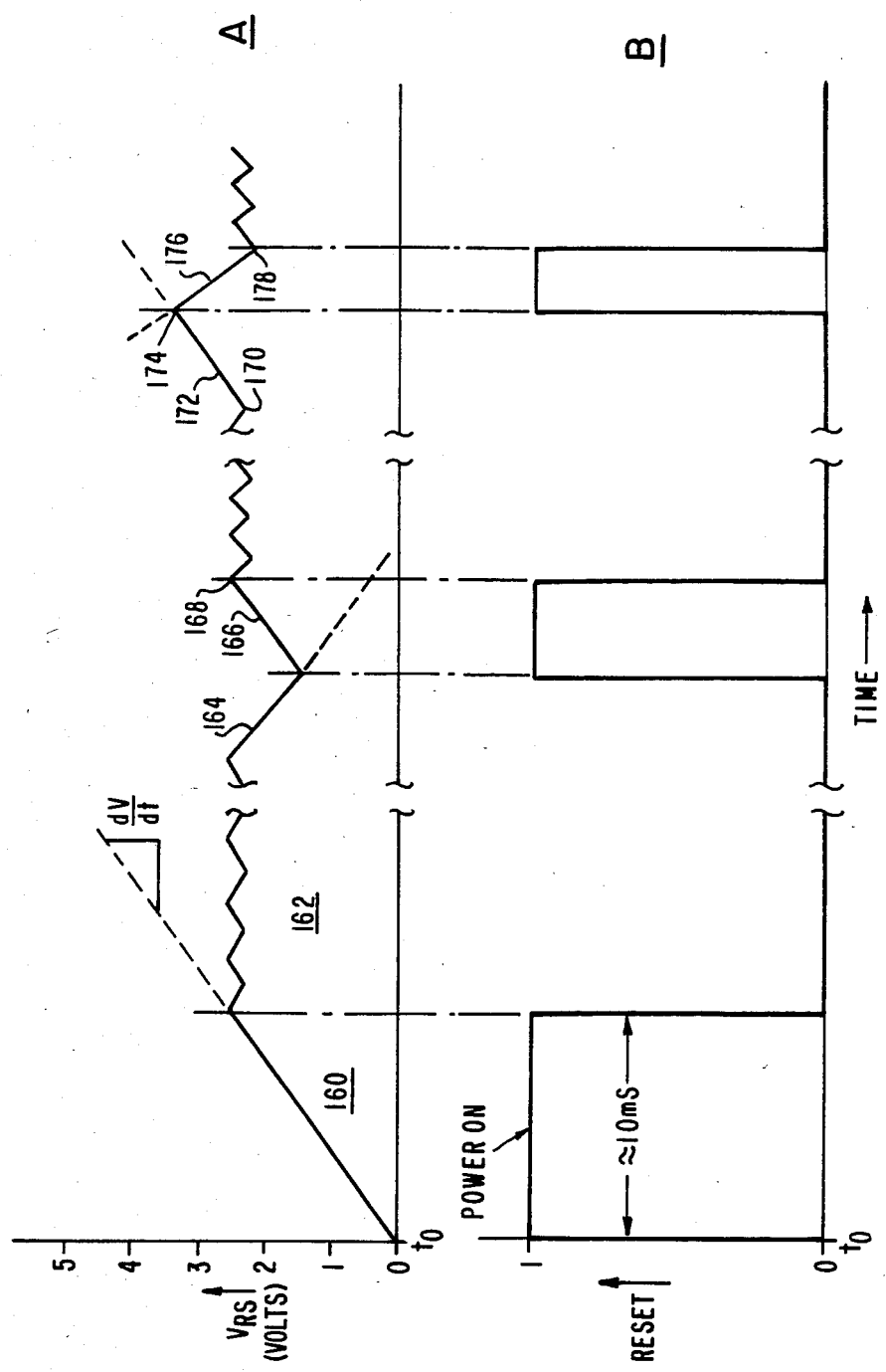
FIG. 9 is a time graph exemplifying a number of operational situations of the supervising circuit of FIG. 7.

The waveforms A and B of FIG. 9 exemplify three conditions in which the supervising circuit 70 including the undervoltage function may provide a reset signal. The abscissa of the graphs of waveforms A and B respresents time. The ordinate of waveform A is a measure of the voltage $V_R$ across the charge storage device CA1 and the ordinate of waveform B represents the digital state of the reset signal over signal line 66. Assume that the power supply V+ achieves its proper potential at time $t_O$. Thus, the transistor Q74 is blocked; however, no restart signal is generated by the processing unit 24 because the reset signal generated by the circuit 70 through transistor Q70 maintains the program execution thereof at an initial point.

When power level is achieved such that circuit 70 becomes operative, current may be supplied to the charge storage device CA1 from the current source 150 via switching function SF4. The voltage $V_R$ will rise at a rate based on the current supplied thereto and the value of the storage device CA1 itself. In the present embodiment as shown by the portion 160 of waveform A, the current and charge storage device value are chosen to permit approximately 10 milliseconds for the voltage $V_R$ to reach the voltage potential V3 (refer to FIG. 8) which is somewhat less than the midrange between V1 and V4. When $V_R$ reaches V3, the reset signal is relieved and program execution is permitted to continue from the initial point. Thus, the restart signal will be generated with a proper duty cycle to maintain the voltage $V_R$ across this charge storage device within range, i.e. for the present embodiment between 1.5 V and 3.5 V.

Should improper program execution exist causing an out-of-range duty cycle such as that shown at 164 in the waveform A, the voltage $V_R$ will diminish until it reaches the voltage reference V4 which may be set at 1.5 volts as mentioned hereabove. Thereupon, the charge storage device is charged at a current level provided by the source 150 to increase the voltage $V_R$ as shown by the portion 166 of waveform A. During the time the charge storage device CA1 is being charged at current $I_{RS}$, the reset signal is generated causing the program execution to be maintained at the predetermined initial point. When the voltage $V_R$ reaches V3 as shown at point 168 of the waveform A, the reset signal is relieved and the restart signal may again be generated at the proper duty cycle which maintains the voltage $V_R$ across the charge storage device CA1 within range. At some future time, say at point 170 of the waveform A, for example, the duty cycle of the restart signal may become out-of-range at the high end causing the voltage across the capacitor CA1 to increase which occurs during the portion 172 of waveform A. At point 174, the voltage $V_R$ exceeds the reference voltage V1 causing the reset signal to again be generated and causing the current source 148 to discharge the capacitor CA1 to reduce the voltage $V_R$ thereacross which occurs during the portion 176 of waveform A. At 178, the voltage $V_R$ is reduced below the reference voltage V2 whereat the reset signal is relieved and current source 148 disconnected. Thereafter, the restart signal may be generated at the proper duty cycle maintaining the voltage $V_R$ within range.

Figure 10:
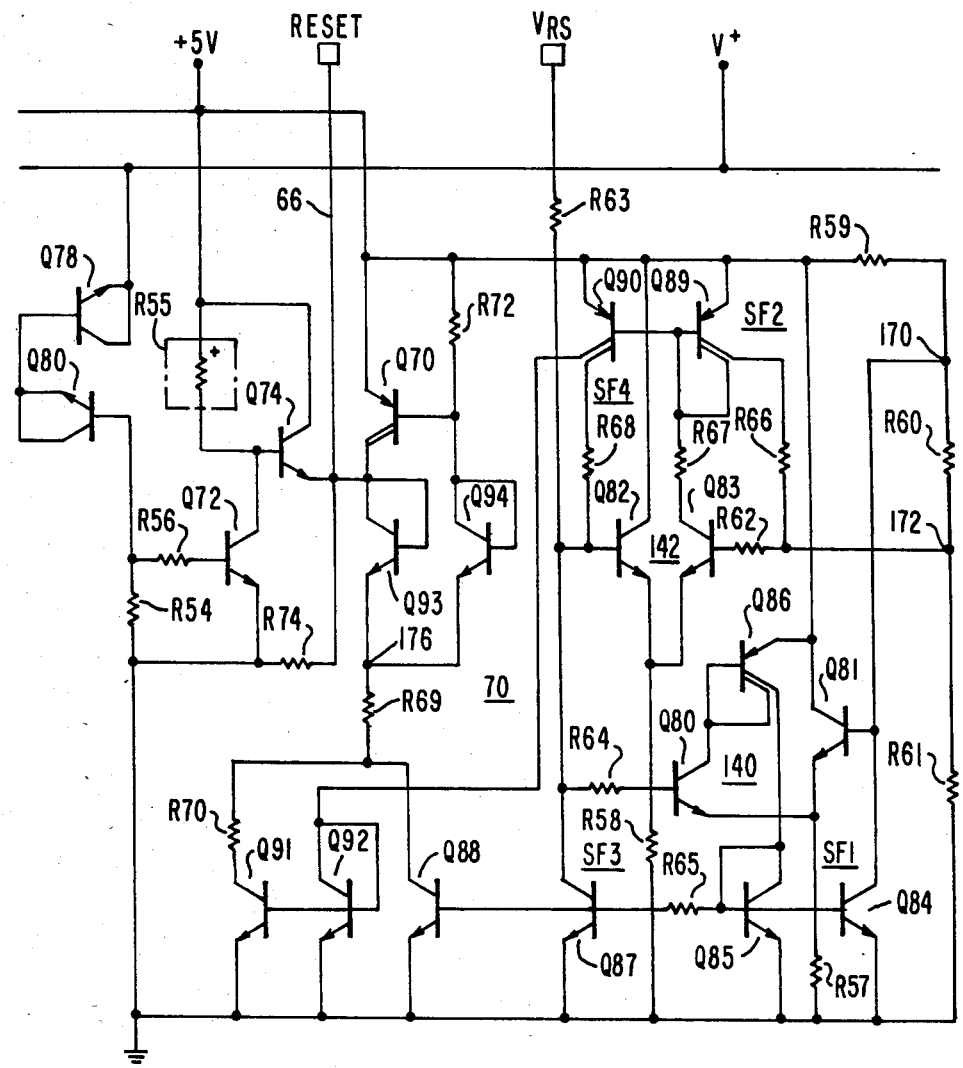
FIG 10 is a circuit schematic diagram suitable for embodying the functions of the supervising circuit embodiment depicted in FIG. 7.

A more detailed circuit embodiment of the supervising circuit 70 and undervoltage function for use in the integrated circuit 20 is shown in FIG. 10. Referring to FIG. 10, the ZD1 function is implemented by two cascadedly coupled transistors Q78 and Q80. The collector and emitter of Q78 are tied to the V+ bus with its base coupled in cascade to the common collector and emitter junctions of Q80. The base of Q80 is coupled to ground through the resistor R54 and coupled to the base of Q72 through a resistor R56 which may be of the value 1.8K ohms. The resistor R55 may be a variable resistance with a full range of 30K ohms. The remainder of the implementation for the undervoltage function in FIG. 10 remains much the same as that described in connection with the functional embodiment of FIG. 7.

With regard to the supervising circuit 70 of FIG. 10, the circuit 140 comprises the transistors Q80 and Q81 having their emitters coupled together through resistor R57 to ground potential. The resistor R57 may have a value of 7.65K ohms, for example. Likewise, the circuit 142 comprises the transistors Q82 and Q83 having their emitters connected together and coupled through resistor R58 to ground potential, the resistor R58 having a value of approximately 7.2K ohms for the present embodiment. A voltage divider network is implemented by a series connection of resistors R59, R60, and R61 which may have values on the order of 6.75K ohms, 8.1K ohms and 5.4K ohms, respectively. The series resistance is connected between the 5-volt bus and ground potential. The series connection point 170 between resistors R59 and R60 is coupled to the base of transistor Q81 as a reference voltage potential therefor. Similarly, the series connection at point 172 between the resistors R60 and R61 is coupled to the base of transistor Q83 through a resistor R62 which may be on the order of 450 ohms. The voltage at point 172 acts as a reference potential for the circuit 142.

The restart terminal which is coupled to the charge storage device CA1 is coupled to the base of transistor Q82 through a resistor R63 which may be on the order of 670 ohms and is further coupled to the base of transistor Q80 through another resistor R64 which may be on the order of 450 ohms.

In the instant circuit embodiment, the switching function SF1 comprises the transistor Q84 having its collector coupled to the point 170 and its emitter coupled to ground potential. Another transistor Q85 is configured as a forward biased diode coupled between the base of transistor Q84 and ground potential. The base of Q84 is coupled to the collector of another transistor Q86 which is a double collector transistor having the second collector and base thereof coupled together to the collector of transistor Q80, the emitter of Q86 being coupled to the 5-volt bus. The first collector of Q86 is also coupled to the base of a transistor Q87 through a resistor R65 which may be on the order of 3.8K ohms. The transistor Q87 implements the switching function SF3 in the present embodiment. The collector of Q87 is coupled to the restart line and the emitter thereof being coupled to ground potential. The first collector of Q86 is also coupled to another transistor Q88 through resistor R65, the emitter of Q88 being coupled to ground potential.

The switching function SF2 is implemented in the instant embodiment by a dual collector transistor Q89 having its emitter coupled to the 5-volt bus and one of its collectors coupled to the point 172 through resistor R66 which may be on the order of 200 ohms. The second collector of Q89 may be coupled to its base and also to the collector of Q83 through a resistor R67 which may also be on the order of 200 ohms. In addition, the switching function SF4 of the instant embodiment may comprise the dual collector transistor Q90 having its emitter tied to the 5-volt bus and one of its collectors coupled to the restart line through a resistor R68 which may be on the order of 100 ohms. The transistors Q89 and Q90 have their bases tied together. The second collector of the transistor Q90 is coupled to the base of another transistor Q91 and thereafter coupled to ground potential through a transistor Q92 configured as a forward biased diode.

The collector and base of the transistor Q70 are connected through separate paths to a circuit point 176. Each path including a transistor Q93 and Q94, both configured as forward biased diodes. The circuit point 176 is coupled to the collector of Q91 through a series connection of resistors R69 and R70 which may be of the values 3.7K ohms and 3.6K ohms, respectively. The series connection between R69 and R70 may be coupled to the collector of Q88. In addition, a resistor R72 may be coupled between the base of Q70 and the 5-volt bus, the value of R72 being on the order of 6.75K ohms. Moreover, a resistor R74 may be coupled from the reset line 66 to ground potential, the value of R74 being on the order of 6.8K ohms, for example.

In operation, initial reference voltages which are representative of the voltages V1 and V4 as described in connection with the embodiment of FIG. 7 and the graph of FIG. 8 are provided at points 170 and 172, respectively. When the voltage $V_R$ falls below V4, transistor Q82 is blocked and transistor Q83 is energized which causes both transistors Q89 and Q90 to be forward biased. The voltage at point 172 increases to a new value, say V3, for example, caused by the current from the first collector of transistor Q89. In addition, current is provided to the charge storage device from one of the collectors of Q90 through resistors R68 and R63. Still further, the other collector of Q90 forward biases transistor Q91 which in turn forward biases transistor Q70 to generate the reset signal over signal line 66. When the voltage $V_R$ increases beyond the voltage V3 set at the point 172, transistor Q83 is blocked and transistor Q82 is forward biased. Blocking transistor Q83 also blocks transistors Q89 and Q90 causing the voltage at point 172 to return to its initial reference setting of V4, for example, and also causing termination of the current provided to the charge storage device. Also in this state, the current from Q90 forward biasing Q91 is terminated thus blocking Q91 which also blocks Q70 relieving the reset signal over signal line 66.

On the opposite end of the spectrum, should the voltage $V_R$ increase beyond the reference voltage setting at point 170, say V1, for example, transistor Q81 becomes blocked and transistor Q80 become forward biased. In this state, the transistor Q86 is forward biased causing current to flow to the bases of transistors Q84 and Q87 to forward bias them both. As a result, current is drawn from point 170 through Q84 causing the voltage thereat to decrease to a lower voltage, say V2, for example. Concurrently, current is drawn through Q87 from the charge storage device through the resistor R63 of the restart line causing the voltage $V_R$ to decrease. In this same state, the transistor Q86 also forward biases transistor Q88 which turns on the transistor Q70 and causes the reset signal to be generated over signal line 66. The foregoing conditions remains until the voltage $V_R$ falls below the new reference potential V2 set at point 170 at which time transistor Q81 becomes energized and transistor Q80 becomes blocked. In this state, transistor Q86 is blocked which deenergizes the transistors Q84, Q87 and Q88. Consequently, the voltage at point 170 is permitted to return to its initial setting, say V1, for example, current being drawn from the restart line through transistor R63 is terminated, and the reset signal is relieved. In this manner, the foregoing described circuit of FIG. 10 achieves the functions which have been described in connection with the embodiment of FIG. 7 and the characteristics of the graph of FIG. 8.

What is claimed is:

1. An analog signal processing circuit adapted for use in an integrated circuit, said processing circuit comprising:
 an analog signal multiplexing circuit including a plurality of input current paths, an output current path, a channel select circuit responsive to a first set of coded selection signals for selecting an input current path in accordance with the code of said first set of selection signals and for coupling said selected input current path to said output current path to permit current therebetween, and first circuit means for maintaining the selected input current path at a first predetermined potential; and a ranging circuit including an input and an output current path, said input current path of said ranging circuit being coupled to said output current path of said multiplexing circuit, a plurality of current splitters coupled in a cascaded chain having one end of said chain coupled to said input current path, each of said current splitters coupled to one and another current paths, a range select circuit responsive to a second set of coded selection signals for splitting the current of the input current path between said one and another current paths of said current splitters in a proportion as governed by the code of said second set of selection signals, and means for providing current at the output current path representative of the current through the other current paths of said current splitter, whereby the current of the input current path is ranged at the output current path in accordance with the code of the second set of selection signals.

2. The analog signal processing circuit in accordance with claim 1 wherein:

the channel select circuit includes second circuit means for maintaining the unselected input current paths at a second predetermined potential, and a switching circuit for each input current path, each switching circuit operative to connect its corresponding input current path to the output current path when the corresponding input current path is at the first predetermined potential and to disconnect its corresponding input current path from the output current path when the corresponding input current path is at the second predetermined potential; and the first circuit means includes a comparator circuit means for each input current path, only the comparator circuit means of the selected input current path being activated to maintain its corresponding input current path at the first predetermined potential which operates the corresponding switching circuit to connect the selected input current path to the output current path, each comparator circuit means corresponding to the unselected input current paths being deactivated by the second potential of the unselected input current path associated therewith.

3. The analog signal processing circuit in accordance with claim 2 wherein the second circuit means includes a transistor for each input current path, each transistor being coupled between a third predetermined potential and its corresponding input current path and operative when energized to maintain its corresponding input current path at the second predetermined potential, said plurality of transistors being energized in accordance with the code of the first set of selection signals.

4. The analog signal processing circuit in accordance with claim 3 wherein each transistor is a bipolar NPN transistor having its collector coupled to the third predetermined potential and its emitter coupled to the input current path associated therewith.

5. The analog signal processing circuit in accordance with claim 2 wherein each switching circuit includes a transistor coupled between the output current path and its corresponding input current path, each transistor being forward biased to conduct current between said output and corresponding input current path when said corresponding input path is at the first predetermined potential and reverse biased to open the circuit between said output and corresponding input current path when said corresponding input path is at the second predetermined potential.

6. The analog signal processing circuit in accordance with claim 5 wherein each switching circuit transistor is a bipolar NPN transistor, said plurality of transistors having their collectors commonly coupled to the output current path and their bases commonly coupled to the plurality of comparator circuit means, each transistor having its emitter coupled to its corresponding input current path.

7. The analog signal processing circuit in accordance with claim 2 wherein the first predetermined potential is substantially ground potential and the second predetermined potential is at a positive voltage with respect to ground potential.

8. The analog signal processing circuit in accordance with claim 1 wherein the first predetermined potential is substantially ground potential.

9. The analog signal processing circuit in accordance with claim 1 wherein each current splitter includes first and second inputs and a common output to effect two separate current paths from which current may be drawn to said common output, the division of current drawn from said separate current paths being predeterminately fixed;

wherein the plurality of current splitters being cascaded by coupling the output of one to the first input of another, the output of the current splitter at one end of the cascaded chain being coupled to the input path of the ranging circuit and the first input of the current splitter at the other end of said chain being coupled to a first source; and wherein the range select circuit includes:

a switch for each current splitter, each switch being operative in one position to couple together the first and second inputs of the corresponding current splitter, whereby current is caused to be drawn from the cascaded chain through both paths of the corresponding current splitter resulting in no current ranging effect thereby, and operative in another position to couple the second input of the corresponding current splitter to a second source to cause current to be drawn from said second source through the second current path of the corresponding current splitter to effect a current ranging thereby according to the predetermined current division of the separate current paths thereof; and control circuitry for operating the plurality of switches in accordance with the code of the second set of selection signals to effect an overall ranging of the current drawn from the input current path of the ranging circuit, current representative of said ranged input current being provided at the output current path of the ranging circuit.

10. The analog signal processing circuit in accordance with claim 9 wherein the ranging circuit includes three cascadedly coupled current splitters, the current splitter coupled to the input current path having a current division of one-half and one-half, the current splitter coupled between the other two having a current division of one-half and one-half, and the current splitter coupled to the first source having a current division of three-fourths and one-fourth; and wherein said control circuitry is operative to position the three switches of the corresponding current splitters to effect an overall current range from the selection of one, one-half, one-fourth and one-sixteenth in accordance with the code of the second set of selection signals.

11. The analog signal processing circuit in accordance with claim 9 wherein the ranging circuit includes a current limiter circuit disposed between the first source and the current splitter at the other end of the chain.

12. The analog signal processing circuit in accordance with claim 9 wherein the ranging circuit includes a current mirror circuit which is coupled to the first source, the first input of the current splitter at the other end of the chain, and the output current path, said current mirror circuit providing an output current at the output current path, said output current being substantially equal to the ranged input current.

13. The analog signal processing circuit in accordance with claim 9 wherein the ranging circuit includes an overrange detection circuit coupled to the output current path for detecting an overrange condition at the output current path and generating a signal indicative thereof.

14. The analog signal processing circuit in accordance with claim 13 wherein the overrange detection circuit includes a comparator circuit for generating an overrange signal when the voltage of the output current path exceeds a predetermined reference voltage.

* * * * *